US006450325B1

(12) United States Patent
Devnani

(10) Patent No.: US 6,450,325 B1
(45) Date of Patent: Sep. 17, 2002

(54) POWERED CONVEYOR SYSTEM WITH MULTIPLE ROLLERS

(75) Inventor: Deepak Devnani, Waterford, MI (US)

(73) Assignee: Jervis B. Webb Company, Farmington Hills, MI (US)

( * ) Notice: Subject to any disclaimer, the term of this patent is extended or adjusted under 35 U.S.C. 154(b) by 38 days.

(21) Appl. No.: 09/660,836

(22) Filed: Sep. 13, 2000

(51) Int. Cl.$^7$ ............................................. B65G 13/06
(52) U.S. Cl. ....................................... 198/788; 198/784
(58) Field of Search .............................. 198/780, 784, 198/788, 817

(56) References Cited

U.S. PATENT DOCUMENTS

| | | | | |
|---|---|---|---|---|
| 4,832,185 A | * | 5/1989 | Huber | 198/788 |
| 4,844,231 A | * | 7/1989 | Usui | 198/784 X |
| 4,949,837 A | | 8/1990 | Huber | 198/782 |
| 5,020,657 A | | 6/1991 | Huber | 198/782 |
| 5,215,184 A | | 6/1993 | Huber | 198/782 |
| 5,904,239 A | * | 5/1999 | Narisawa | 198/788 X |
| 5,918,728 A | * | 7/1999 | Syverson | 198/788 |

OTHER PUBLICATIONS

Interroll: Driverroll Rollers; "The Inside Story"; pp. 10–14.

* cited by examiner

Primary Examiner—James R. Bidwell
(74) Attorney, Agent, or Firm—Dickinson Wright PLLC

(57) ABSTRACT

The present invention relates to a powered roller bed with multiple rows of rollers, wherein two or more self-powered rollers are provided on each row along the bed. The rollers are preferably powered by electromagnetic motors having a stationary shaft and a rotating cylinder thereon so that each one can be independently controlled and operated. The present invention preferably provides a means of installing and removing each roller by hand without the aid of tools.

20 Claims, 2 Drawing Sheets

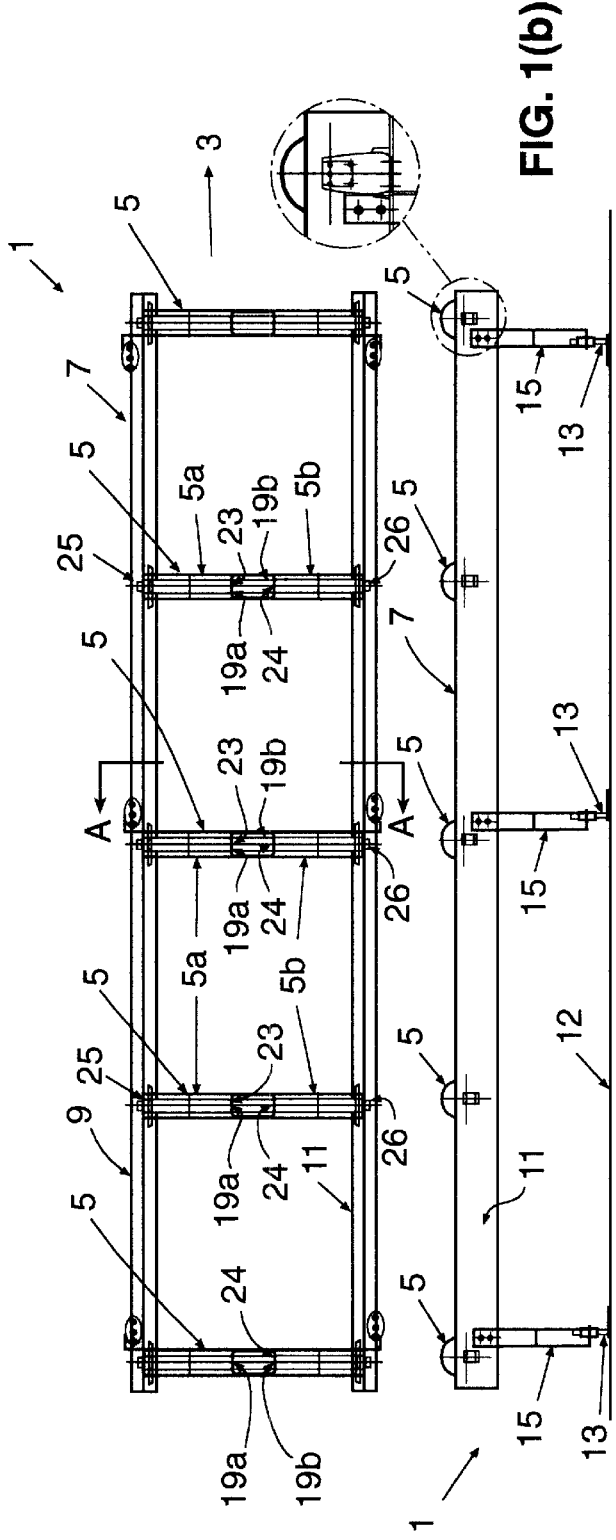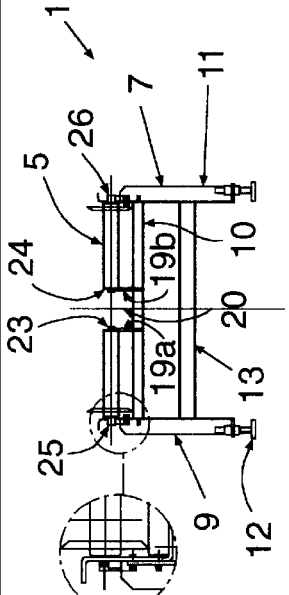

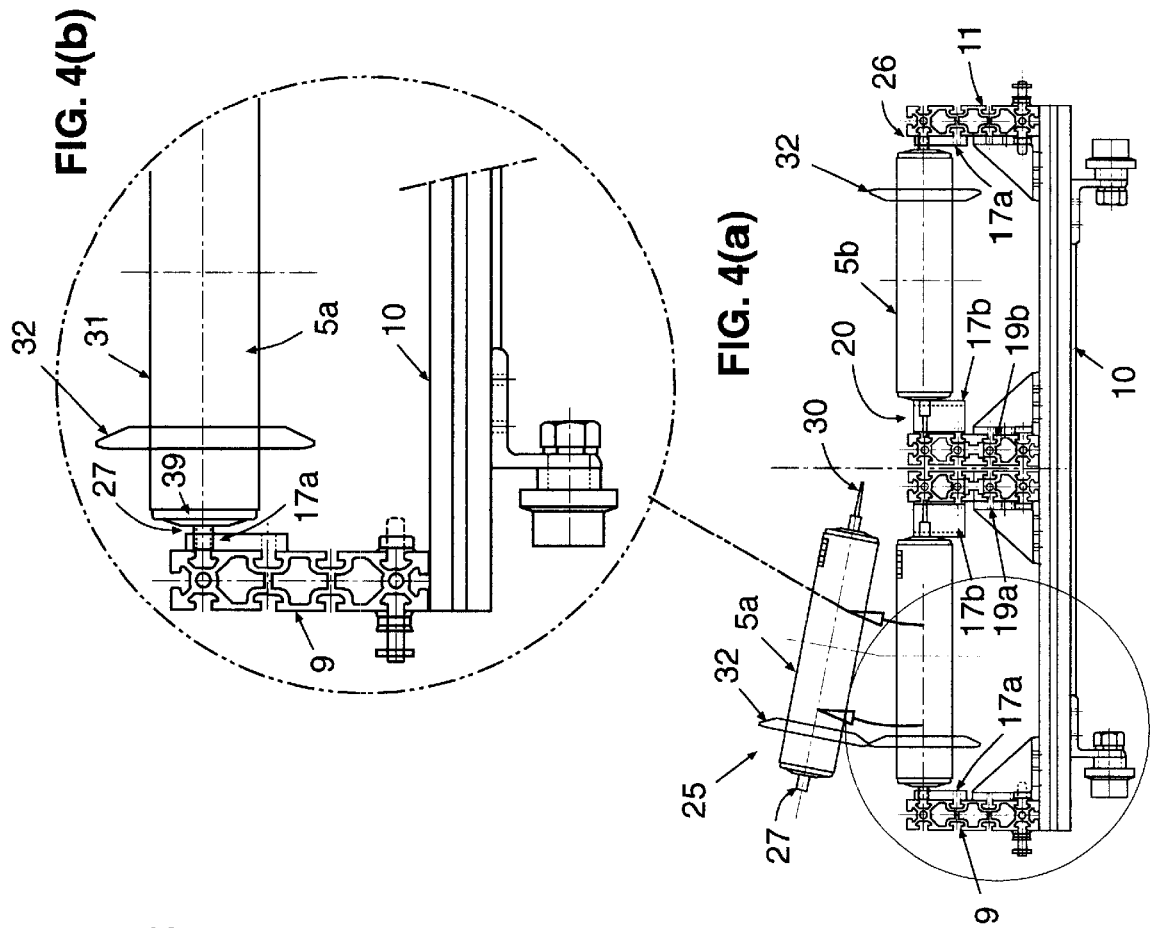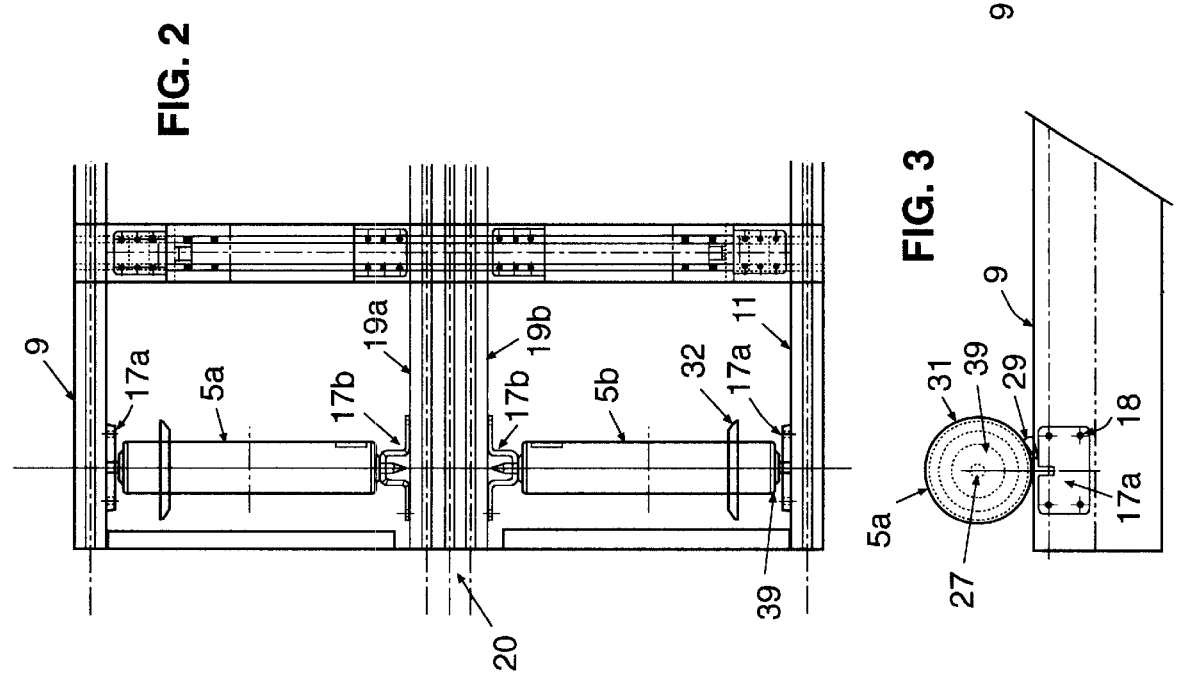

POWERED CONVEYOR SYSTEM WITH MULTIPLE ROLLERS

FIELD OF THE INVENTION

The present invention relates to the field of conveyor system roller beds, and in particular, to a powered roller bed with multiple rollers on each row.

BACKGROUND OF THE INVENTION

Conveyor system roller beds typically comprise a series of rollers driven by a chain to move articles traveling thereon from one location to another. Rollers in such systems are typically supported on a frame and positioned transverse to the direction of travel. A typical roller bed also has side walls or bumpers to help maintain articles, such as skids, packages, luggage, automobile parts, etc., on the bed as they travel thereon.

In prior roller bed designs, sets of spaced apart rollers are typically daisy-chained together so that multiple rollers can be driven by a single motor. While each roller in such systems can be provided with its own gears, the gears are chained together so that a single motor can be used to drive the chain, which in turn drives the rollers. Belts on fluted rollers can also be used.

A disadvantage of such systems, however, is that if one motor breaks down, the entire section of the conveyor system driven by that motor shuts down as well. Such rollers are also difficult to replace because the chain must be disengaged to access the rollers and often have covers that must be removed. Such rollers are also not capable of being independently controlled and operated, thereby making it more difficult to control the articles traveling on the bed.

In view of the drawbacks of prior conveyor system roller beds of the kind described above, a need has developed for an improved roller bed design. The present invention solves the above problems by providing rollers that are independently controlled and operated, and by providing a plurality of rollers on each row (or roller axis) of the bed. The present invention also contemplates rollers that can be easily installed and removed without the need of tools, so that downtime can be minimized.

SUMMARY OF THE INVENTION

The present invention represents an improvement over previous conveyor system roller bed designs, and in particular, designs incorporating rollers that are daisy-chained together and driven by a single motor. Like previous roller bed designs, the present invention comprises multiple rollers mounted transverse to the direction of travel, but unlike previous designs, the present invention comprises rollers with self-contained motors that allow each roller to be independently controlled and operated, as well as a plurality of rollers on each row of rollers, i.e., two or more rollers extending end-to-end on each row, which are capable of being easily replaced.

In one aspect, the present invention comprises using self-powered rollers that have electromagnetic motors with an inverted stator and rotor design, wherein a hollow cylindrical roller can rotate about a fixed shaft. Each roller preferably has high torque capacity and is provided with its own gear box, clutch, brake, control unit, etc. The rollers are also preferably capable of being connected to a central control unit to allow each one to be independently controlled and operated. Using self-powered rollers eliminates the need for certain components found in previous designs, including chains and belts, line shafts and other drive elements, as well as elaborate safety guards to cover the moving parts.

In another aspect, the present invention comprises more than one self-powered roller on each row, i.e., two or more rollers preferably extending (end-to-end) along the same axis transverse to the direction of travel. In this respect, the present invention is preferably adapted so that on any given row, one shaft of one roller can be mounted to the frame on one side of the bed, and another shaft of another roller can be mounted to the frame on the other side of the bed, wherein the rollers can be mounted end-to-end along the same axis. In the preferred arrangement, there are two rollers on each row or axis, although more than two rollers can be used. The rollers also do not have to extend along the same axis.

Providing more than one roller on each row has certain advantages not offered by a single roller design. For example, providing multiple rollers on each row allows the speed of the articles traveling thereon to be adjusted with more accuracy and flexibility. In this respect, a roller bed can effectively be split into two or more roller beds running side by side, which can be beneficial in situations where one roller bed is connected to two roller beds extending in different directions. That is, by effectively splitting the roller bed in this manner, articles on one side of the bed can be driven at one speed (prior to entering the first connected bed), and articles on the other side of the bed can be driven at another speed (prior to entering the second connected bed), such that by the time the articles reach their destinations, the articles are traveling at the appropriate speeds—the same speed as the connected beds.

Providing rollers on each row moving at different speeds can also be advantageous when used in connection with conveyor runs that have curved paths, wherein the travel distance along the outside of the curve is greater than that along the inside. In this respect, the rollers on the outside can be driven faster than those on the inside, to accommodate the greater travel distance along the outside, which can be particularly advantageous in helping to control small articles around a turn.

In another aspect of the invention, each roller is preferably adapted to be attached to the conveyer frame in a manner that allows them to be easily installed and/or removed by hand (without the use of tools), which can significantly reduce downtime in the event of a broken roller. For example, the present invention contemplates using two slotted brackets per roller that can be secured to the frame to support each roller, wherein each roller's shaft can be inserted into the slots within the brackets and connected to the frame. In this way, to remove a roller from the frame, the roller simply has to be lifted up and out of the brackets, and to install a roller, the roller simply has to be lowered into the brackets. No screws, nuts or bolts are otherwise required to maintain the rollers securely on the frame.

Although the preferred embodiment of the present invention has been disclosed above, the present invention contemplates that other embodiments, such as those not specifically mentioned herein, which provide similar functions, are also within the contemplation of the present invention.

BRIEF DESCRIPTION OF THE DRAWINGS

FIGS. 1(*a*), 1(*b*) and 1(*c*) show a plan view, side view and end view, respectively, of a typical arrangement of the roller bed design of the present invention;

FIG. 2 shows a plan view of a section of the roller bed design of the present invention;

FIG. 3 shows a side view of the connecting bracket and one roller of the roller bed design of the present invention; and FIGS. 4(a) and 4(b) show a front view and exploded view, respectively, of the roller bed design of the present invention.

DETAILED DESCRIPTION OF THE INVENTION

FIGS. 1(a), (b) and (c) show a roller bed 1 having multiple sets 5 of rollers 5a and 5b, preferably spaced apart an equal distance from one another in the longitudinal direction. While the preferred embodiment of the present invention relates to a roller bed, the arrangement of the present invention can also be provided in connection with a transfer table, such as one used to transfer articles from one level of a conveyor system to another. Although references to roller beds 1 shall be made in the following discussion, it should be understood that the present invention is also equally applicable to transfer tables.

The roller bed 1 of the present invention is preferably constructed with a frame 7 which extends longitudinally in a predetermined direction (as shown by arrow 3) to form a supporting conveyor structure in the conventional manner. The frame 7 generally comprises a first longitudinal support member 9, and a second longitudinal support member 11, with multiple transverse support sections 13 extending therebetween. The longitudinal support members 9, 11 are preferably formed of metal, such as from extruded aluminum tubes, as shown in FIGS. 2–4. The bed 1 is preferably rigidly mounted in a conventional manner to a mounting surface 12, and can be elevated to a predetermined height using supports 15, such as shown in FIG. 1(b), which are connected to support members 9, 11. The frame 7 can be formed along a curved path (not shown) to accommodate bends and turns along the conveyor run if desired.

The present invention preferably has multiple sets 5 of two rollers 5a and 5b each, spanning the width of the frame 7, between longitudinal support members 9, 11. The two rollers 5a and 5b in each set 5 are preferably mounted end-to-end, with a space 20 in between, as shown in FIG. 1(c), along a single axis extending transverse to the direction of travel. In this respect, an end 25 of roller 5a is preferably mounted on support member 9, while an end 23 of the same roller is preferably mounted on a central support member 19a. Likewise, an end 26 of the second roller 5b (in each set) is preferably mounted on support member 11, while an end 24 of the same roller is preferably mounted on central support member 19b. Central support members 19a and 19b are preferably supported by additional transverse members 10, shown in FIG. 1(c), provided in the center of the frame 7. The central support members 19a, 19b can be part of a single bracket extending upward from the frame 7, or can be two individual brackets, as shown in FIG. 1(c). Central support members 19a, 19b can also be constructed like the longitudinal support members 9, 11, i.e., they can be made of extruded aluminum tubes, which can be extended longitudinally along the length of the bed, as shown in FIGS. 2–4. In such case, the tubes can serve as a housing for the electrical connecting lines extending from each of the rollers 5a and 5b.

The distance between support members 9, 11 depends on the desired width of the roller bed 1, and can vary from less than one foot to several feet. The actual spacing can depend on several factors, including the intended size of the articles to be conveyed, the desired throughput, and the amount of space available at the site, etc.

The longitudinal spacing between each set 5 of rollers 5a and 5b, i.e., from one transverse axis to the next, depends on several factors, including the size, length and weight of the articles to be conveyed by the system. In this respect, the spacing is preferably such that the bottom of the article is in constant contact with at least three and preferably four rows of rollers at any given time, regardless of where the article is positioned on the bed. Accordingly, where long skids are used, the preferred spacing between roller sets 5, which would result in the skid being in contact with at least four rows of rollers at any one time, would be about one-fifth of the length of the skid. That is, if a skid is five feet long, then the rows would preferably be spaced apart about one foot from each other, to ensure that at least four rows of rollers are always in contact with the skid, no matter where the skid moves along the bed.

Each roller 5a and 5b of the present invention preferably comprises an outer hollow cylinder 31 capable of rotating around a fixed shaft 27, wherein each roller preferably has a separate motor 40 for driving the cylinder 31 on bearings about the shaft 27. In this respect, each roller 5a and 5b preferably has an electromagnetic motor with an inverted stator and rotor design, wherein the shaft 27 is fixed to the frame 7, and the cylinder 31 can rotate about the shaft 27. The preferred roller 5a and 5b operates at a relatively low voltage, but has a high torque capacity with plenty of reserve power. Each roller 5a and 5b also preferably has its own gear box, transmission, brake, control unit, 42, etc. The control unit in each roller controls the operation of the roller and can be connected to an electrical power supply via an electric lead 30 in any conventional manner.

The shaft 27 can be made of any standard hard and durable material, such as zinc plated or stainless steel. The cylinder 31 can also be made of any standard materials and finishes, including aluminum, stainless steel and carbon steel. One common type of material is electrically welded carbon steel with a zinc coated finish. The cylinders 31 can also be covered with a standard coating, such as polyurethane or soft PVC, for improved traction, cushioning and noise reduction. An example of a roller that can be adapted for use with the present invention is the Driverroll™ made by Interroll.

Each roller 5a and 5b is preferably capable of being electrically connected to a central control unit via an electrical lead 30 extending from the rollers 5a and 5b. The lead 30 preferably connects to a line extending along the center of the frame 7, i.e., such as within the central support members 19a and 19b. The central control unit is preferably adapted so that each roller in the system can be independently controlled and operated, i.e., turned on and off, speed adjusted, direction reversed, brake applied, etc. In this respect, the central control unit can also be provided with an identifying means for locating the rollers in the system so that the operator can easily identify which rollers are being controlled and operated. For example, the central control unit can be provided with a map of the conveyor system with indicators, such as LED's, and other readout devices, showing the location of each roller, as well as the operational condition of each one, i.e., whether the roller is on, the speed of the roller, the direction of the roller, etc. The central control unit can also be provided with a microprocessor if desired, which can be programmed so that various settings and sequences can be automatically employed.

The rollers 5a, 5b of the present invention are preferably supported on brackets 17a and 17b, which are connected to the frame 7 (on support members, 9, 11, 19a, and 19b), at the appropriate locations, as shown in FIGS. 2–4. A pair of brackets 17a and 17b is preferably provided to support each roller, 5a, 5b, wherein four brackets are preferably provided on each row or axis (where two rollers are provided). Bracket 17a is preferably made of a flat steel plate, and bracket 17b is preferably made of a flat u-shaped steel plate (that provides a space between the roller and center support member to provide room for the electrical lead 30). The extended u-shaped bracket 17b, like the one shown in FIG. 2, allows there to be a space between each roller and central support member so that there is enough room to extend the electrical leads 30 from the rollers 5a, 5b and connect them properly.

A first flat plate bracket 17a is preferably connected to longitudinal support member 9, i.e., by bolts 18 or the like, and a second u-shaped bracket 17b is preferably connected to central support member 19a, i.e., also by bolts or the like, for supporting a single roller 5a. Likewise, with respect to any single axis, another flat plate bracket 17a is preferably connected to longitudinal support member 11, and another u-shaped bracket 17b (for supporting the same roller 5b) is preferably connected to central support member 19b, as shown in FIG. 2, also by bolts 18 or the like.

The distance between each pair of brackets 17a and 17b for any given roller is preferably predetermined to accommodate the length of the roller's shaft 27, i.e., the distance is preferably slightly greater than the length of the cylinder 31, but slightly less than the length of the shaft 27, for a relatively secure fit. In this respect, a non-rotating flange portion 39 extending from the shaft 27 at the end of each cylinder 31 is preferably provided, wherein the flange portions 39 are adapted to abut the brackets 17a and 17b, respectively, such that they help to limit the linear movement of the shaft 27 in the direction of the shaft's axis (without interfering with the rotation of the cylinders 31). Different size u-shaped brackets 17b can be used to accommodate shafts of different lengths.

Each shaft 27 of each roller 5a, 5b preferably has two opposing ends that are adapted to be fitted directly into slots 29 located on the brackets 17a, 17b in a relatively secure manner. In this respect, each bracket 17a, 17b preferably has a slot 29 along the top, as shown in FIG. 3, into which an end of a roller's shaft 27 can be inserted, such that each roller 5 can be secured simply by placing the roller's shaft 27 into the respective slots 29. The cross-sectional shapes of the ends of the roller's shaft 27 are preferably configured to match the shape of the slots 29, such that non-rotational engagement between them can be provided. For example, the ends of the shaft 27 can be squared, or rectangular, in which case the slots 29 would also be squared, or rectangular, with straight edges to match the sides of the shaft. Other shapes that can provide non-rotational engagement between them can also be provided. This enables the shaft 27 of each roller 5a and 5b to be securely mounted onto the brackets 17a and 17b without any nuts, bolts or other fastening means. The shaft 27 is preferably supported by brackets 17a, 17b without any nuts, bolts or locks which might otherwise be needed to maintain the shaft 27 in the brackets.

The slots 29 preferably enable each roller 5a and 5b to be easily removed from the frame 7, simply by lifting the roller up and out of the slots 29 by hand. In this respect, the slots 29 are preferably oriented in a vertical or near vertical direction to enable the rollers 5a and 5b to be easily inserted, and removed, thereby making installation and removal relatively simple. The slots 29 are also preferably tapered along the upper edge to make it easy for the roller's shaft 27 to the inserted into the brackets from above. The preferred connection also preferably avoids rattling and prevents frame hole rounding.

As shown in FIGS. 2 and 4, the space 20 that can exist between the rollers 5a and 5b along any given axis, i.e., such as where the central support members 19a and 19b are located, can advantageously provide a conduit through which the electrical lines extending from the rollers 5a and 5b (to the central control unit) can be provided. Preferably, providing a space between rollers 5a and 5b does not affect the functionality of the system because the present system is intended to be used in connection with articles such as skids (not shown), which can have two structural support members extending downward on either side, wherein the loads carried by the skids could then be divided between the two support members. In such case, the loads that are transferred from the skid to the conveyor surface, i.e., the rollers, would be transferred directly to the rollers, wherein no load would then be applied to the center of the bed 1. The present system can also be used in connection with articles that are wide enough to extend across the space between the rollers 5a and 5b, wherein the load would then be transferred directly to both rollers.

The design of the present invention provides several useful applications that were not previously available. For example, using multiple self-powered rollers 5a and 5b enables the speed of each roller to be independently controlled and operated, which in turn can help precisely control the speed of the articles traveling thereon. An example of where having multiple self-powered rollers can be advantageous is the following: A skid can be traveling 90 feet per minute on one conveyor, but it may then need to be transferred onto another conveyor traveling only 12 feet per minute, i.e., for assembly line work. With the present invention, because the speed of each roller 5a and 5b can be adjusted independently, the skid can be gradually slowed down as it travels on the bed toward the connected conveyor. That is, the speed of each roller can be incrementally reduced, such that by the time the skid reaches the next conveyor, the skid will be traveling at 12 feet per minute, for an easy transition. At the same time, the roller bed of the present invention can be used to gradually accelerate the skid, such as from 12 feet per minute, to 90 feet per minute, where a higher speed conveyor is attached at the end of a slower conveyor. In this respect, a disadvantage of having multiple rollers daisy-chained together and driven by a single motor, as in past systems, is that the rollers must be driven at the same speed.

Several additional advantages are provided by the present invention by being able to adjust the speed of each roller in each row (set) independently. For example, enabling more than one roller in each row to be independently controlled and operated enables the speed of the articles traveling on the bed to be controlled with more accuracy and flexibility. In this respect, the present invention offers the advantage of being able to effectively split the roller bed into two or more roller beds running side by side, which can be beneficial in situations where one roller bed is connected to two roller beds extending in different directions, wherein some of the articles are transferred onto one of the connected beds, and some of the articles are transferred onto the other. For instance, a conveyor line may be moving at 50 feet per minute, but may be connected to two additional conveyor lines going in different directions, one moving at 12 feet per minute, and the other moving at 90 feet per minute. By effectively splitting the bed in the manner described above, the rollers on one side of the bed can be gradually slowed down so that by the time the articles enter the first connected line, the articles will be traveling 12 feet per minute. At the same time, the articles traveling on the other side of the bed can be gradually speeded up so that by the time the articles enter the second connected line, the articles will be traveling 90 feet per minute. In this respect, a wall can be erected in the center of the bed 1, if desired, so that the articles can physically be separated before entering the connected lines.

Providing rollers 5a and 5b on each row capable of moving at different speeds can also be advantageous when used in connection with curved beds and turns. This is because the travel distance along the outside of the curve is greater than the travel distance along the inside of the curve. With the present invention, the rollers that are positioned along the outside of the curve can be driven at speeds that are greater than the rollers positioned on the inside of the curve, such that the greater travel distance along the outside of the curve can be accommodated thereby. This aspect can be particularly advantageous where multiple articles small enough to fit within the width of the bed are conveyed by the system. It can also be used to help guide larger articles around the turns so that they do not rub against the sidewall or bumper.

The ability of the rollers 5a and 5b to be independently powered and controlled also allows the system to continue to be operated despite a break down of any one roller. That is, because there are preferably at least two rollers on each row, and each row is preferably spaced apart so that at least four rows of rollers are in contact with each article at all times, the articles being conveyed can continue to be driven effectively even if any one roller shuts down. In such case, any single roller would only provide about one-eighth of the power needed to drive the article, and therefore, the system could continue to operate until a convenient time is available to shut the entire system down so that the broken roller can be replaced.

Moreover, a broken roller can easily and quickly be replaced simply by removing the roller from the frame 7 (and brackets 17a and 17b) by hand, and replacing it with another roller. This simply requires an operator to lift the broken roller up and out of the slots 29 in the brackets 17a and 17b, and then inserting the new roller into the slots 29, and then connecting the power and control lead 30. The task of replacing the rollers of the present invention is preferably made easy by how the rollers 5a and 5b are connected to the frame 7, via the slotted brackets 17a and 17b, and shafts 27, as discussed above. In this respect, no nuts, bolts or locks have to be undone, and no chains, covers or other devices have to be provided which have to be removed to access the rollers as in past systems.

Furthermore, providing multiple self-powered rollers 5a and 5b on each row allows each roller to be shortened so that the power supplied by each one per unit length of roller can be increased without increasing the size of the motor. This can be beneficial, for example, particularly in relatively wide roller beds, where self-powered rollers would have to extend several feet across the width of the bed, thereby possibly placing undue strain on the motors.

While the roller bed 1 of the present invention shown in the drawings do not have sidewalls or bumpers, it should be understood that conventional sidewalls and/or bumpers can be used to ensure that the articles traveling on the bed are retained thereon. In this respect, the present invention can include an alternative to having sidewalls and bumpers, by having circular flanges 32 on the rollers themselves, adjacent the outer ends 25, 26, which serve to retain the articles on the beds. The flanges 32 can be placed on each roller in a predetermined location to ensure that the articles traveling thereon are retained in the desired manner. The rollers 5a and 5b are otherwise preferably mounted such that each cylinder 31 extends above the support members 9, 11 (so that they do not interfere with the articles on the bed).

The features of the present invention described above are applicable to roller beds and transfer tables. Transfer tables are used in conveyor systems and are typically extended between conveyor runs to transfer articles from one run to another, i.e., such as from one run that extends perpendicular to another, or from one run that extends at a different level than another. In most relevant parts, the transfer table of the present invention can be constructed in much the same way as the roller bed 1, with the difference being that the transfer table is relatively short, and capable of being moved, i.e., lifted or rotated, etc., independently of the main conveyor runs.

The present invention provides a new and improved powered roller bed and transfer table design with multiple rows of rollers, and has been disclosed in terms of the preferred embodiments thereof. Nevertheless, various changes, modifications and alterations from the teachings of the present invention are contemplated, which can be included in the present invention, without departing from the intended scope thereof.

What is claimed is:

1. A conveyor system with multiple rollers, comprising:
   a frame extending in a predetermined direction and having a plurality of rows of rollers extending substantially transverse to said predetermined direction;
   at least two rollers in each of said rows, wherein each of said rollers is capable of being independently powered and controlled; and
   wherein said frame comprises at least two longitudinal support members, along with at least two intermediate support members, wherein on any given row, one roller is positioned between one longitudinal support member and one intermediate support member, on one side, and a second roller is positioned between a second longitudinal support member and a second intermediate support member, on the other side.

2. The system of claim 1, wherein each row has two rollers.

3. The system of claim 1, wherein slotted brackets are provided on said longitudinal support members and said intermediate support members to enable each of said rollers to be removably secured to said frame.

4. The system of claim 1, wherein each of said rollers comprises a stationary shaft capable of being mounted onto said frame, and a rotatable cylinder extending about said shaft, wherein said rotatable cylinder is driven by an electromagnetic motor having an inverted rotor and stator design housed within said cylinder.

5. The system of claim 1, wherein a central control unit is provided which enables the speed at which each of said rollers rotates to be independently controlled, wherein said control unit is capable of causing a first set of rollers extending along said one side of said frame and a second set of rollers extending along said other side of said frame to rotate at different speeds.

6. The system of claim 5, wherein a second connected run and a third connected run, each having multiple rollers thereon, are connected to said frame in a manner that causes articles traveling on said one side of said frame to travel onto said second connected run, and articles travelling on said other side of said frame to travel onto said third connected run.

7. The system of claim 6, wherein said first set of rollers is adapted to rotate at a first speed, and said second set of rollers is adapted to rotate at a second speed, and wherein said rollers on said second connected run are adapted to rotate at a first modified speed, and said rollers on said third connected run are adapted to rotate at a second modified speed, wherein said control unit is capable of causing the rotational speed of said first set of rollers to be progressively varied along said predetermined direction from said first speed to said first modified speed, and the rotational speed of said second set of rollers to be progressively varied along said predetermined direction from said second speed to said second modified speed.

8. A conveyor system with multiple rollers, comprising:
a frame extending in a predetermined direction and having a plurality of rows of rollers extending substantially transverse to said predetermined direction;
at least two rollers in each of said rows, wherein each of said rollers is capable of being independently powered and controlled; and
wherein each of said rollers is removably connected to said frame in a manner that allows said rollers to be installed and removed without the need of tools.

9. The system of claim 8, wherein a pair of slotted brackets is provided on said frame for connecting each of said rollers to said frame, wherein each bracket has a slot in which a roller's shaft can be inserted, wherein said slot has a configuration that provides non-rotational engagement between said shaft and said bracket.

10. A method of providing a conveyor system having multiple rollers thereon, comprising:
providing a conveyor having a frame extending in a predetermined direction, said frame having a plurality of rows of rollers extending substantially transverse to said predetermined direction, and at least two rollers in each of said rows; and
providing rollers that are capable of being independently controlled and operated, and removably connecting said rollers to said frame in a manner that allows said rollers to be installed and removed by hand.

11. The method of claim 10, comprising operating said rollers such that the speed of each of said rollers can be varied independently, wherein the speed of an article traveling on said conveyor system can be adjusted thereby.

12. The method of claim 10, comprising providing rollers having a stationary shaft and a rotating cylinder, wherein said cylinder is capable of being driven by an electromagnetic motor housed within said cylinder, and wherein each roller has a transmission, brake, control unit, and electrical connection.

13. The method of claim 10, comprising providing a central control unit, and connecting said rollers to said central control unit, such that each of said rollers is capable of being independently controlled and operated by said central control unit.

14. The method of claim 10, comprising adapting the connection of said rollers to said frame with slotted brackets, wherein said rollers can be removed by lifting them up and out of said brackets by hand.

15. A method of using a conveyor system having multiple rollers thereon, comprising:
providing a frame having a plurality of rows of rollers thereon and extending it in a first predetermined direction;
connecting a first run having a plurality of rows of rollers thereon to said frame and extending it in a second predetermined direction;
enabling each of said rollers on said frame to be independently powered and controlled;
providing a central control unit capable of causing a first set of rollers extending along one side of said frame to rotate at a first speed, and a second set of rollers extending along a second side of said frame to rotate at a second speed, wherein articles travelling on said first set of rollers can be conveyed onto said first run; and
allowing said rollers on said first run to rotate at a first modified speed, and the speed of said first set of rollers to be progressively varied along said first predetermined direction from said first speed to said first modified speed.

16. The method of claim 15, comprising connecting a second run having a plurality of rows of rollers thereon to said frame and extending it in a third predetermined direction, wherein articles travelling on said second set of rollers can be conveyed onto said second run, and allowing said rollers on said second run to rotate at a second modified speed, and the speed of said second set of rollers to be progressively varied along said first predetermined direction from said second speed to said second modified speed.

17. A method of operating and maintaining a conveyor system having multiple rollers thereon, comprising:
providing a conveyor having a frame extending in a predetermined direction, said frame having a plurality of rows of rollers connected thereto, each of said rows extending transverse to said predetermined direction, and having a plurality of rollers thereon;
providing rollers that are capable of being independently controlled and operated; and
individually connecting each of said rollers on said frame on slotted brackets in a manner that allows each of said rollers to be installed and removed from said frame without the need of tools.

18. The method of claim 17, further comprising the step of providing a connection between said slotted brackets and said rollers' shafts, wherein the engagement between said brackets and said shafts is non-rotational.

19. The method of claim 18, further comprising the step of providing said shafts with ends having a predetermined shape, and said slotted brackets with a predetermined shape that substantially matches said predetermined shape of said shaft ends.

20. The method of claim 18, further comprising the step of adapting said connection such that each of said rollers is substantially restricted from moving in a direction that extends along the shaft's axis.

* * * * *